United States Patent [19]

Kline et al.

[11] Patent Number: 4,546,614
[45] Date of Patent: Oct. 15, 1985

[54] PRECOOLED DETECTOR LEADS

[75] Inventors: Mark L. Kline, Fullerton; Oakley G. Ross, Upland, both of Calif.

[73] Assignee: General Dynamics Pomona Division, Pomona, Calif.

[21] Appl. No.: 600,068

[22] Filed: Apr. 13, 1984

[51] Int. Cl.[4] .............................................. F25D 25/00
[52] U.S. Cl. ...................................... 62/62; 62/514 R; 165/47; 165/185; 250/352; 250/370
[58] Field of Search ......... 62/514 R; 250/352, 370 L; 165/47, 185

[56] References Cited
U.S. PATENT DOCUMENTS

| 3,006,157 | 10/1961 | Haettinger et al. | 250/352 |
| 3,258,602 | 6/1966 | Promish | 250/352 |
| 3,349,161 | 10/1967 | Latham | 62/514 R |
| 3,429,368 | 2/1969 | Buchhold et al. | 165/47 |
| 3,654,377 | 4/1972 | Fleming et al. | 62/514 R |
| 3,978,686 | 9/1976 | Lechner et al. | 62/514 R |
| 4,340,405 | 7/1982 | Steyert, Jr. et al. | 62/514 R |

Primary Examiner—Ronald C. Capossela
Attorney, Agent, or Firm—Neil F. Martin; Edward B. Johnson

[57] ABSTRACT

The leads for an infrared detector unit are arranged to pass through bores in a cooled detector housing with intimate contact with the cooled detector housing for precooling the leads extending from the detector elements to the respective preamp leads.

6 Claims, 3 Drawing Figures

U.S. Patent    Oct. 15, 1985    4,546,614
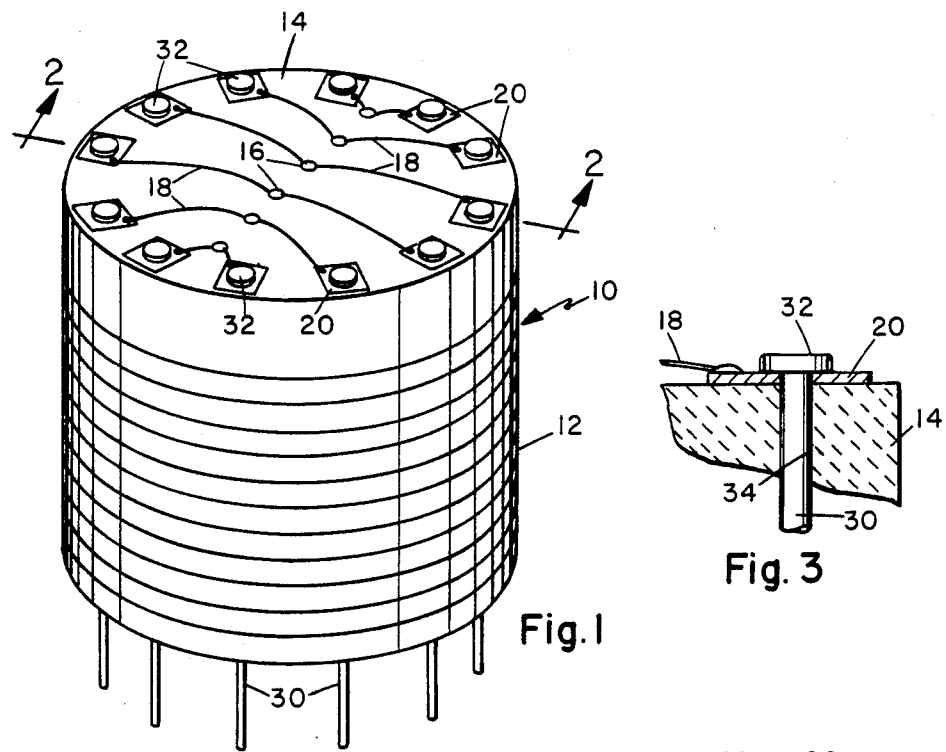
Fig. 1
Fig. 3
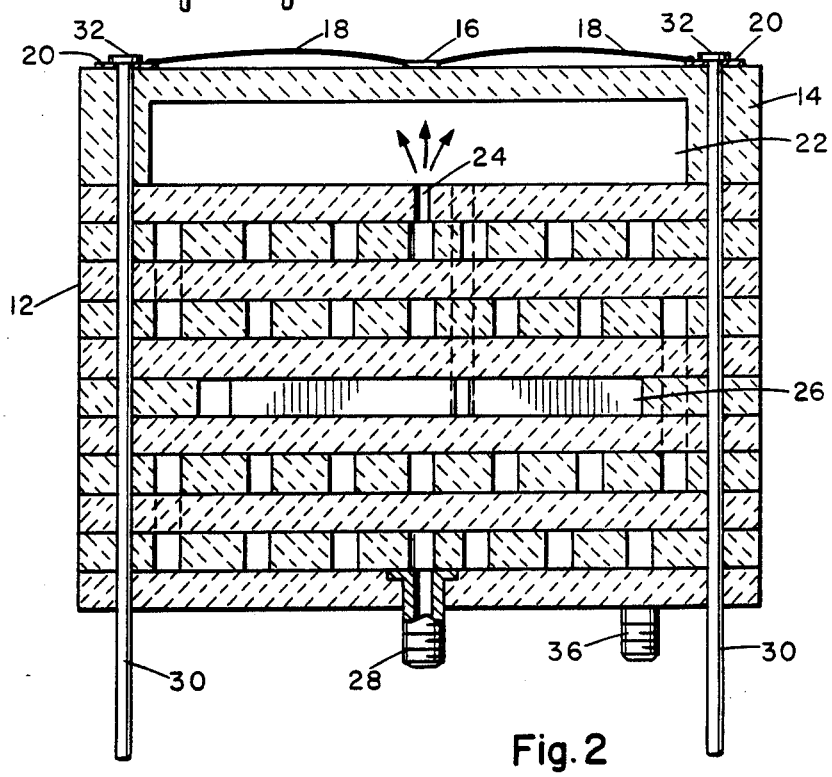
Fig. 2

PRECOOLED DETECTOR LEADS

BACKGROUND OF THE INVENTION

The present invention relates to cryogenic detectors and relates particularly to a device for precooling detector leads for an infrared detector.

Infrared detectors are typically cooled cryogenically in order to reduce the temperature of the detector to improve its efficiency and performance and to reduce the signal-to-noise background noise to enhance the operation thereof. The detector leads to the infrared detectors are frequently a source of heat for the detectors. It is therefore desirable that some means be available to precool the detector leads to reduce the transmission of heat to the detectors.

SUMMARY AND OBJECTS OF THE INVENTION

It is therefore the primary object of the present invention to provide an improved cooling means for detector leads to an IR detector.

In accordance with the primary aspect of the present invention, the detector leads for an IR detector are passed through the cooled IR detector post for precooling the leads for reducing the conduction of heat to the detector.

BRIEF DESCRIPTION OF THE DRAWINGS

The above and other objects and advantages of the present invention will become apparent from the following description when read in conjunction with the drawings wherein:

FIG. 1 is a perspective view of a cryogenic detector post with enclosed leads;

FIG. 2 is an enlarged sectional view taken on line 2—2 of FIG. 1; and

FIG. 3 is a further enlarged portion of FIG. 2 showing a single lead connection.

DETAILED DESCRIPTION OF A PREFERRED EMBODIMENT

Referring to FIG. 1 of the drawings, a cryogenically-cooled infrared (IR) detector post designated generally by the numeral 10 comprises a generally cylindrical body member constructed in accordance with the disclosure in our co-pending application U.S. Ser. No. 600,064 filed concurrently herewith entitled "Cryogenic Detector Post". This post is made up of a plurality of wafers of a nonconductive material having grooves formed therein forming passageways and cooling chambers for providing optimum cooling of the detector post and particularly the detector substrate. More particularly, the detector post comprises a body 12 of a nonconductive material formed into a monolithic body from the previously described disc-like wafers. The post includes a ceramic substrate or cap 14 forming the substrate on which one or a plurality of detectors 16 are mounted and connected by leads 18 to gold contact or bonding pads 20.

The ceramic substrate or cap 14 is formed to have a generally cylindrical inner cooling chamber 22 into which a high pressure compressed gas is introduced by way of an orifice 24 for cooling the substrate 14. A plurality of ceramic or the like wafers or discs having the appropriate grooves or passages formed therein to provide a connecting network of a supply passage and exhaust passage with precooling chambers 26, for example, provide a system for introducing a compressed gas by way of an inlet port 28 and returning by way of an outlet port 36 for cooling the detector post.

A detector post in accordance with this invention as described and constructed in accordance with our previously described co-pending application provides an improved detector post of a nonconducting material which reduces electromagnetic interference from adjacent metallic sources. In addition, the device provides an improved rugged construction able to withstand heavy shock loads, such as experienced from ordnance rounds and the like.

A plurality of pin head leads 30, each having a pin head 32 bonded or connected to a pad 20 extend through a plurality of bores 34 formed within the detector post 10 parallel to the axis thereof and in a pattern around the periphery thereof. These detector leads 30 preferably are formed to fit in heat transfer contact with the walls of the bore 34 such that the leads are cooled as a result of passing through the cooled housing 12 of the detector post. This provides a precooling of the leads 30, thus eliminating or considerably reducing the temperature differential between the detectors 16 or detector active area on the end of the detector post and the preamp connection.

The detector leads 30 can also serve to function as alignment means for aligning the wafers for the appropriate passageway configuration prior to fusing the wafers into the monolithic detector post configuration. The wafers are formed with prepositioned bores such that the leads 30 extend through the bores 34 serving to align the wafers. The nonmetallic, nonconductive construction of the post also provide insulation for the detector leads preventing short-circuiting of the leads.

While we have illustrated and described our invention by means of a single embodiment, it is to be understood that numerous changes and modifications may be made therein without departing from the spirit and scope of the invention as defined in the appended claims.

We claim:

1. A detector lead cooling assembly comprising:
   a nonconductive detector post having sensing means mounted on one end thereof;
   cooling means for cooling said post;
   a plurality of conductor leads connected to said sensing means;
   precooling means for precooling said leads, said precooling means comprising a plurality of bores extending along said post; and
   said leads extending along said bores in heat transfer relation to said post.

2. The cooling assembly of claim 1 wherein said leads include a pin head on one end thereof bonded to a gold bonding pad.

3. The cooling assembly of claim 1 wherein said cooling means includes a network of passages extending through said detector post.

4. The cooling assembly of claim 3 wherein said detector post is generally cylindrical in configuration and said plurality of bores extend generally parallel to the axis thereof and are disposed around the perimeter thereof.

5. A method of cooling leads to a cryogenically cooled detector device, comprising the steps of:

selecting said detector device constructed of a nonconductive detector post with a sensor mounted at one end thereof;
forming a plurality of lead receiving bores in said post; and
passing said leads through said bores in said cryogenically cooled detector device in heat transfer relation therewith.

6. The method of claim 5 including the steps of:
selecting said detector device constructed of a ceramic material having a network of cooling passages therein;
forming a plurality of lead receiving bores in said device; and
mounting leads in said bores.

* * * * *